Patented Apr. 30, 1946

2,399,600

UNITED STATES PATENT OFFICE 2,399,600

SUBSTITUTED 4,4'-DIAMINODIPHENYL SULPHONES AND PROCESS OF MAKING SAME

Lucas P. Kyrides, Webster Groves, Mo., assignor to Monsanto Chemical Company, St. Louis, Mo., a corporation of Delaware No Drawing. Application March 20, 1943,
Serial No. 479,915

5 Claims. (Cl. 260—397.6)

This invention relates to certain new derivatives of 4,4'-diaminodiphenyl sulphone and to the process of producing them.

These new products have been found to possess therapeutic activity in the treatment of various diseases.

These new derivatives may be represented by the following general formula:

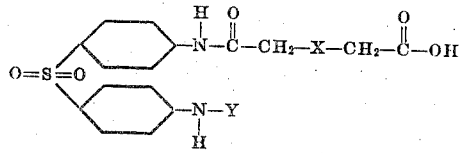

in which X represents a sulphide, disulphide, thionyl, sulphone or oxygen residue and Y represents hydrogen, an acyl or the residue:

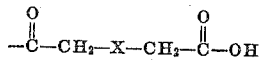

in which X has the same meaning as before.

In preparing these new products, the procedure in general is the following:

To a solution (or suspension) of one molecular equivalent of 4,4'-diaminodiphenyl sulphone in a suitable solvent, such as acetone, methyl alcohol, ethyl alcohol, ethylene glycol or dioxane, is added two molecular equivalents of the anhydride halide or mono-ester acyl halide of an acid selected from the group consisting of diglycolic acid, thiodiglycolic acid, dithiodiglycolic acid, thionyl diglycolic and sulphondiacetic acids. The reaction mixture is desirably refluxed for several hours and the solvent thereupon removed by evaporation under reduced pressure. The residue and oil are solidified by treatment with water. The solid material is filtered off and dried. The product may be purified by dissolution in alcohol, filtration through charcoal, addition of water and agitation until crystallization of the product is effected. Prepared in this manner, the product may retain some water of crystallization, which may be removed if desired by drying the product, for example, in a stream of heated air or in vacuo at a temperature below the decomposition point of the product.

For the preparation of the monoacylamino derivative, one molecular equivalent of the anhydride, halide or mono-ester acyl halide is employed in place of two molecular equivalents. As an alternative to the diacylamino compounds, mixed acylamino compounds may be prepared by first reacting one molecular equivalent of one of the anhydrides in the group hereinbefore described with the diaminodiphenyl sulphone and then reacting one molecular equivalent of another of the anhydrides in the group hereinbefore described or any other suitable anhydride, for example, acetic anhydride. Also, the order of the substitution may be reversed, for example, first reacting acetic anhydride and then reacting one of the anhydrides in the group hereinbefore described.

The 4,4'-diaminodiphenyl sulphone is desirably obtained by refluxing a mixture of parachloronitrobenzene and sodium sulphide in water, reacting the resulting p-aminothiophenolate with a molecular equivalent of parachloronitrobenzene, acylating the resulting 4-nitro-4'-aminodiphenyl sulphide with acetic anhydride, oxidizing the sulphide to the sulphone, removing the acetyl residue by acid hydrolysis and reducing the 4-nitro-4'-aminodiphenyl sulphone to the diamino compound.

A desirable procedure for obtaining the monoacylamino derivatives of the present invention comprises acylating 4-nitro-4'-aminodiphenyl sulphide with a molecular equivalent of the anhydride of one of the acids selected from the group hereinbefore described, oxidizing the 4-nitro-4'-acylaminodiphenyl sulphide to the sulphone and subsequently reducing the nitro residue to the amine.

A desirable procedure for obtaining the diacylamino derivative of the present invention comprises reducing 4-nitro-4'-aminodiphenyl sulphide to 4,4'-diaminodiphenyl sulphide, acylating the sulphide with two molecular equivalents of the anhydride of one of the acids selected from the group hereinbefore described, and subsequently oxidizing the sulphide to the sulphone.

Both the free acids and the salts of the compounds of the present invention may be employed for therapeutic purposes. Examples of the alkali metal salts are the di-sodium, di-potassium, and mixed sodium and potassium salts of N,N'-di-diglycolyl-4,4'-diaminodiphenyl sulphone. These salts may be prepared, for example, by dissolving a molecular equivalent of the derivative in an aqueous solution of sodium carbonate containing from one to two molecular equivalents of the alkali-metal carbonate and recovering the salt by evaporation of the water. Examples of the alkaline-earth metal salts are the calcium and magnesium salts. The ammonium salts and substituted ammonium salts may also be employed for therapeutic purposes, and also the mixed ammonium and alkali metal or alkaline-earth metal salts. In the therapeutic administration of the derivatives of this invention, the oral method is desirably employed, although parenteral methods may be employed. In the case of parenteral administration, the acid may be dissolved in an aqueous solution containing the salt-forming substance, such as sodium hydroxide, and the solution thus formed may be employed for the treatment.

The following preparations and examples serve to illustrate the general process. It is to be understood, however, that these examples do not limit the invention since other methods for preparing the compounds of this invention are contemplated.

PREPARATION 1

*4-nitro-4'-aminodiphenyl sulphide*

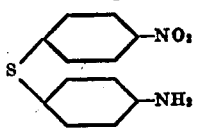

This substance may be prepared according to the method described in J. Am. Chem. Soc., 61, 2763 (1939), in which p-chloronitrobenzene is refluxed with sodium sulphide in aqueous solution, the resulting p-aminothiophenolate is refluxed with a molecular equivalent of p-chloronitrobenzene and the reaction mixture subsequently steam-distilled to remove unchanged p-chloronitrobenzene. The product is crystallized from the nonvolatile portion and recrystallized from alcohol.

PREPARATION 2

*4-nitro-4'-aminodiphenyl sulphone*

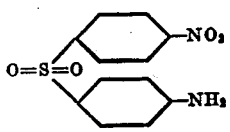

A solution of 187 grams of 4-nitro-4'-aminodiphenyl sulphide, prepared according to the method described under Preparation No. 1, in 510 cc. of glacial acetic acid and 161 cc. of acetic anhydride was refluxed for two hours to effect acetylation of the amino group. 800 cc. of glacial acetic acid was then added and the temperature was adjusted to 90° C. During three hours, 317 cc. of 30% hydrogen peroxide was added dropwise. The temperature was maintained at 90° C. for an additional half hour and the mixture was cooled and diluted with 2500 cc. of water. The crude 4-nitro-4'-acetylaminodiphenyl sulphone was filtered off and washed with water. This product was mixed with 360 cc. of concentrated hydrochloric acid, 1,080 cc. of water and 300 cc. of ethyl alcohol. After refluxing for about ten hours, the mixture was cooled to 30° C., and neutralized with 50% soda lye. The precipitated material was filtered off, washed with water and dried at 80° C. Upon analysis, the product was found to be 4-nitro-4'-aminodiphenyl sulphone.

PREPARATION 3

*4,4'-diaminodiphenyl sulphide*

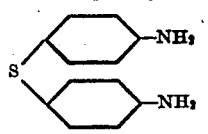

This substance may be prepared according to the method described in J. Am. Chem. Soc., 61, 2763 (1939), in which a suspension of 4-nitro-4'-aminodiphenyl sulphide is treated simultaneously with tin turnings and hydrochloric acid to reduce the nitro group to amino. After the reduction, the product was precipitated from the reaction mixture with alkali, filtered therefrom, refluxed in alcohol and recovered by precipitation with water and filtration. The product may be recrystallized from 50% alcohol.

PREPARATION 4

*4,4'-diaminodiphenyl sulphone*

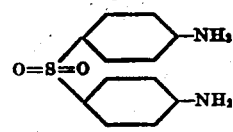

This substance was prepared according to the method described in J. Am. Chem. Soc., 61, 2763 (1939), in which 4,4'-diaminodiphenyl sulphide and acetic anhydride were refluxed and the resulting 4,4'-diacetylaminodiphenyl sulphide was recovered, oxidized to the sulphone with potassium dichromate in the presence of sulphuric acid and glacial acetic acid, recovered from the reaction mixture and the two acetyl radicals hydrolyzed off with the aid of hydrochloric acid. The 4,4'-diaminodiphenyl sulphone is thereupon precipitated by adding sodium carbonate and the precipitate is recovered and washed. The product may be purified by refluxing with aqueous alcohol and the purified product recovered by adding water to the solution, cooling with ice and separating the solid product by filtration. In the acylation step any suitable anhydride, for example, succinic anhydride or propionic anhydride, or the acyl chloride derivatives of succinic or propionic acids, may be utilized.

PREPARATION 5

*Diglycolic anhydride*

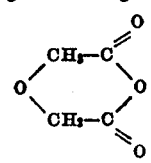

This substance may be prepared according to the method described in Annalen, 259, 190 (1890), in which diglycolic acid is refluxed with acetyl chloride, excess acetyl chloride is distilled off and the residue is dissolved in warm chloroform and crystallized therefrom on cooling.

PREPARATION 6

*Thiodiglycolic anhydride*

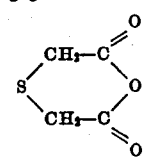

This substance may be prepared according to the method described in Annalen 273, 68 (1893), in which dry thiodiglycolic acid and acetyl chloride are heated, excess acetyl chloride is distilled off and the residue is dissolved in warm chloroform and crytallized therefrom on cooling.

PREPARATION 7

*Dithiodiglycolyl dichloride*

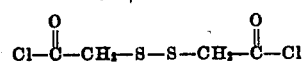

Dithiodiglycolic acid may be prepared according to the method described in German Patent No. 194,039, in which sodium chloracetate and sodium disulphide are reacted and the product is recovered from the reaction mixture. In the preparation of the acyl dichloride, 21.1 grams of dithiodiglycolic acid and 23 grams of thionyl chloride were refluxed in 50 cc. of benzene for three hours. The liquid reaction mixture was decanted from insoluble material and distilled until the solvent and excess thionyl chloride were removed. The residue, dithiodiglycolyl dichloride, may be purified by conventional methods.

As an alternative to the dichloride, the mono-ester acyl halide, for example, monomethyl dithiodiglycolyl chloride, may be prepared and used. The bromides and other halides of dithiodiglycolic acid may be used. In using the halides and mono-ester halides in preparing the compounds of the present invention, it is necessary, after the amide has been formed, to hydrolyze off the remaining halide residue or mono-ester residue in order to obtain the free carboxyl compound.

PREPARATION 8

Thionyldiglycolic anhydride

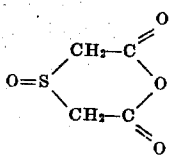

Thionyldiglycolic acid may be prepared according to the method described in J. Chem. Soc. (London), 93, 1834, in which thiodiglycolic acid is treated with an excess of hydrogen peroxide and the product is recovered from the reaction mixture. The anhydride may be prepared according to the methods described in Preparations Nos. 5 and 6.

PREPARATION 9

Sulphondiacetic anhydride

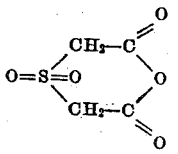

Sulphondiacetic acid may be prepared according to the method described in Berichte 17, 2818, in which thiodiglycolic acid in aqueous alkaline carbonate solution is oxidized with potassium permanganate and the product is recovered from the reaction mixture. The anhydride may be prepared according to the methods in Preparations Nos. 5 and 6.

EXAMPLE I

N-diglycolyl-4,4'-diaminodiphenyl sulphone

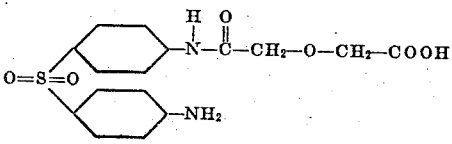

A mixture of 24.6 grams of 4-amino-4'-nitrodiphenyl sulphide, 75 cc. of acetone and 12 grams of diglycolic anhydride was refluxed for two hours and thereafter allowed to stand for ten hours at 25° C. The reaction product, N-diglycolyl-4-amino-4'-nitrodiphenyl sulphide, was crystallized from the mixture as a yellow solid and was filtered off, washed with acetone and dried. The acetone mother liquor was evaporated. Water was added to the residual oil and the mixture was stirred until the oil was solidified. The solid material was filtered, washed with water and dried at 80° C.

A solution of 27.8 grams of this material in 80 cc. of glacial acetic acid was prepared and heated to 90° C. During three hours, 31.7 cc. of 30% hydrogen peroxide was added dropwise to the solution. The temperature was maintained at 90° C. for an additional half hour. Thereafter the mixture was cooled and diluted with 100 cc. of water. The precipitated product was filtered off, washed with water and dried at 80° C. The product of this reaction was N-diglycolyl-4-nitro-4'-aminodiphenyl sulphone.

As an alternative preparation of N-diglycolyl-4-nitro-4'-aminodiphenyl sulphone, a mixture of 27.8 grams of 4-nitro-4'-aminodiphenyl sulphone, 75 cc. of acetone and 12.0 grams of diglycolic anhydride was refluxed for two hours and cooled to 25° C. Upon standing, a yellow solid crystallized out. The product was filtered off, washed with acetone and dried; weight 32 grams. The acetone filtrate was evaporated, the residual oil was treated with 100 cc. of water and the mixture was stirred until the product solidified. The crystals were filtered off, washed with water and dried at 80° C. The total yield was 39.4 grams (100%).

A mixture of 39.4 grams of N-diglycolyl-4-nitro-4'-aminodiphenyl sulphone with 35.7 grams of granulated tin in 250 cc. of alcohol was treated with 250 cc. of 10% hydrochloric acid. The mixture was stirred for four hours at 40°-45° C., filtered, and the tin was removed from the filtrate by treatment with hydrogen sulphide. Excess hydrogen sulphide was dissipated by means of a stream of air or by placing the solution under vacuum. The solution was alkalinized with sodium bicarbonate, evaporated to dryness under reduced pressure and the residue was recrystallized. The product was N-diglycolyl-4,4'-diaminodiphenyl sulphone.

The nitro compound also can be reduced catalytically with hydrogen, using a hydrogenation catalyst.

EXAMPLE II

N,N'-di-diglycolyl-4,4'-diaminodiphenyl sulphone

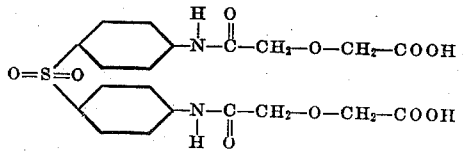

A mixture of 39.4 grams of N-diglycolyl-4,4'-diaminodiphenyl sulphone, prepared according to Example I, and 27.12 grams of diglycolic anhydride was refluxed for two hours and allowed to stand for ten hours at 25° C. The resulting product, N,N'-di-diglycolyl-4,4'-diaminodiphenyl sulphone, was crystallized from the reaction mixture, filtered off and washed with acetone. The acetone mother liquor is treated for further recovery of the product in the manner described in Example I.

As an alternative method, a solution of 12.4 grams of 4,4'-diaminodiphenyl sulphone and 12.0 grams of diglycolic anhydride in 50 cc. of acetone was heated at reflux for two hours. The solvent was removed under reduced pressure, 100 cc. of water was added to the residual oil and the mixture was stirred until the product solidified. The solid was disintegrated in a mortar, filtered off, washed with water and dried at 80° C. The crude yield was 24.7 grams. Purification was effected by crystallization from dilute alcohol; trihydrate, M. P. 100°-102° C. The product contains water of hydration, which may be removed, if desired, by heating in vacuo at 145°–155° C. The product was N,N'-di-diglycolyl-4,4'-diaminodiphenyl sulphone.

Example III

*N-thiodiglycolyl-4,4'-diaminodiphenyl sulphone*

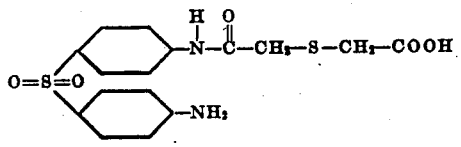

A mixture of 27.8 grams of 4-amino-4'-nitrodiphenyl sulphone, 75 cc. of acetone and 14 grams of thiodiglycolic anhydride was refluxed for two hours. At this time, 100 cc. of water was added and the acetone was evaporated from the mixture. The solid material was filtered off, washed with water and dried at 80° C. The product of this reaction was N-thiodiglycolyl-4-amino-4'-nitrodiphenyl sulphone. A mixture of 41.0 grams of this product with 35.7 grams of granulated tin in 250 cc. of alcohol was stirred with 250 cc. of 10% hydrochloric acid at 40°–45° C. for four hours. Solids were removed by filtration and the filtrate was freed from tin by treatment with hydrogen sulphide. Excess hydrogen sulphide was dissipated by means of a stream of air or by placing the solution under vacuum. The solution was alkalinized with sodium bicarbonate, evaporated to dryness under reduced pressure and the residue was purified by recrystallization.

The nitro compound also may be reduced with hydrogen using a hydrogenation catalyst and some suitable solvent, such as an alcohol, dioxane, etc.

Example IV

*N,N'-di-thiodiglycolyl-4,4'-diaminodiphenyl sulphone*

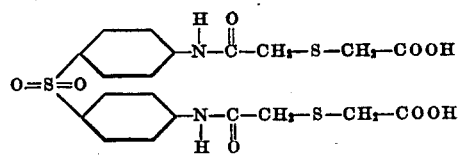

A mixture of 3.9 grams of the product of Example III, 75 cc. of acetone and 1.4 grams of thiodiglycolic anhydride was refluxed for two hours. After this, 100 cc. of water was added and the acetone was evaporated from the mixture. The solid product was filtered off, washed with water and dried at 50° C.

As an alternative to the above procedure, a mixture of 125 grams of 4,4'-diaminodiphenyl sulphone, 500 cc. of acetone and 135 grams of thiodiglycolic anhydride was refluxed for two hours and thereafter the acetone was distilled from the mixture. Water was added and the mixture was stirred. The solid product was thereupon filtered, washed with acetone and dried at 50° C. The product may be recrystallized from an alcohol-water mixture. For further purification, the alcohol-water solution may be treated with charcoal and filtered. Dihydrate, M. P. 147°–148° C. Anhydrous product, M. P. 165–167° C.

Example V

*N-dithiodiglycolyl-4,4'-diaminodiphenyl sulphone*

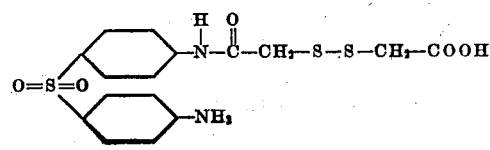

This product may be prepared according to the method of Example III, using monomethyl dithiodiglycolyl chloride in place of thiodiglycolic anhydride, with corresponding changes in the stoichiometrical proportions. The monomethyl residue of the derivative as thus prepared may be hydrolyzed off by conventional methods, for example, by refluxing the material in acetone solution with caustic soda.

Example VI

*N,N' - di-dithiodiglycolyl - 4,4' - diaminodiphenyl sulphone*

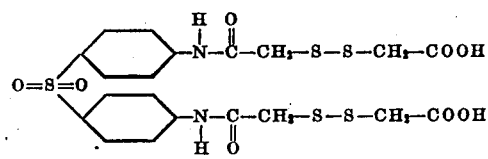

This product may be prepared according to the alternative method of Example IV, replacing thiodiglycolic anhydride with monomethyl dithiodiglycolyl chloride, with corresponding changes in the stoichiometrical proportions. The monomethyl residue of the derivative as thus prepared may be hydrolyzed off by conventional methods, for example, by refluxing the material in acetone solution with caustic soda.

Example VII

*N - thionyldiglycolyl - 4,4' - diaminodiphenyl sulphone*

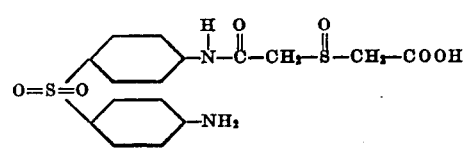

This product may be prepared according to the method of Example III, using thionyldiglycolic anhydride in place of thiodiglycolic anhydride, with corresponding changes in the stoichiometrical proportions.

Example VIII

*N,N'-di-thionyldiglycolyl-4,4'-diaminodiphenyl sulphone*

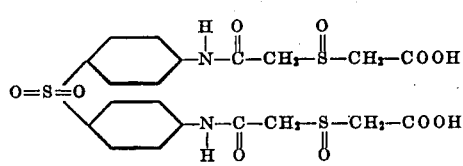

This compound may be prepared according to the alternative method of Example IV, replacing thiodiglycolic anhydride with thionyldiglycolic anhydride, with corresponding changes in the stoichiometrical proportions.

Example IX

*N-sulphondiacetyl-4,4'-diaminodiphenyl sulphone*

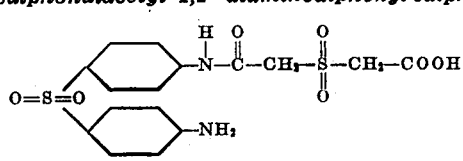

This compound may be prepared according to the method of Example I, replacing diglycolic anhydride with sulphondiacetic anhydride.

It is further a feature of this invention that sulphondiacetic anhydride may be replaced with thiodiglycolic anhydride and the sulphide radicals of the thiodiglycolyl and aminodiphenyl sulphide residues oxidized simultaneously with an excess of hydrogen peroxide to the corresponding sulphones. For example, the diglycolic anhydride of Example I may be replaced with 14 grams of thiodiglycolic anhydride and the quantity of 30% hydrogen peroxide increased to 63.4 cc., or twice that required for the oxidation of one sulphide residue to the corresponding sulphone residue.

EXAMPLE X

*N,N'-di-sulfondiacetyl-4,4'-diaminodiphenyl sulphone*

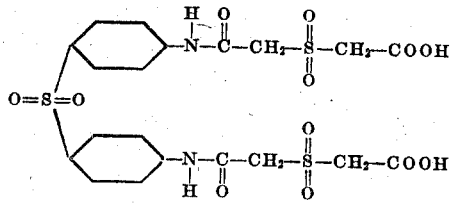

A mixture of 10.8 grams of 4,4'-diaminodiphenyl sulphide, 50 cc. of acetone and 36 grams of sulphondiacetic anhydride was refluxed for two hours. The acetone was evaporated in vacuum. 100 cc. of water was added to the residue and the solid material was triturated in a mortar, washed with water, filtered and dried at 80° C. Upon analysis, the product was revealed to be N,N'-disulphondiacetyl-4,4'-diaminodiphenyl sulphide. A solution of 13.5 grams of this product in 80 cc. of glacial acetic acid was heated to a temperature of about 90° C. During three hours, 31.7 cc. of 30% hydrogen peroxide was added dropwise. The temperature was maintained at 90° C. for an additional half hour and the mixture was cooled and diluted with 250 cc. of water. The precipitated product was filtered off, washed with water and dried at 80° C. The product was N,N'-di-sulphondiacetyl-4,4'-diaminodiphenyl sulphone.

It is a feature of this invention that N,N'-disulphondiacetyl-4,4'-diaminodiphenyl sulphone may be prepared by reacting thiodiglycolic anhydride with 4,4'-diaminodiphenyl sulphide and subsequently oxidizing the sulphide residues to sulphones. For example, in the method of the present example, the sulphondiacetic anhydride may be replaced with 13.6 grams of thiodiglycolic anhydride and the quantity of 30% hydrogen peroxide may be increased to 95.1 cc., or three times that required for the oxidation of one sulphide residue to the corresponding sulphone residue.

EXAMPLE XI

*N-diglycolyl-N'-thiodiglycolyl-4,4'-diaminodiphenyl sulphone*

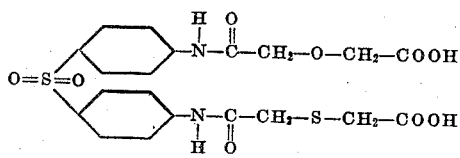

A mixture of 39.4 grams of N-diglycolyl-4,4'-diaminodiphenyl sulphone, prepared according to the method of Example I, 75 cc. of acetone and 14 grams of thiodiglycolic anhydride was refluxed for two hours. 100 cc. of water was added and the acetone was evaporated. The residue was filtered off, washed with water and dried at 80° C. The product was N-diglycolyl-N'-thiodiglycolyl-4,4'-diaminodiphenyl sulphone.

EXAMPLE XII

*N-thiodiglycolyl-N'-sulphondiacetyl-4,4'-diaminodiphenyl sulphone*

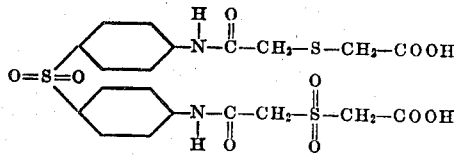

A mixture of 41 grams of N-thiodiglycolyl-4,4'-diaminodiphenyl sulphone, prepared according to the method of Example III, 75 cc. of acetone and 18 grams of sulphondiacetic anhydride was refluxed for two hours. 100 cc. of water was added and the acetone was evaporated. The solid material was filtered off, washed with water and dried at 80° C. The product was N-thiodiglycolyl-N'-sulphondiacetyl-4,4'-diaminodiphenyl sulphone.

As an alternative procedure, N-sulphondiacetyl-4,4'-diaminodiphenyl sulphone may be prepared according to the method of Example I, using thiodiglycolic anhydride in place of diglycolic anhydride and oxidizing the thio residue to sulphone along with the diaminodiphenyl sulphide residue according to the alternative method described in Example IX. This material may then be acylated with thiodiglycolic anhydride according to the method described in Example III.

EXAMPLE XIII

*N-thiodiglycolyl-N'-acetyl-4,4'-diaminodiphenyl sulphone*

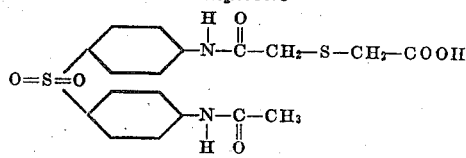

A mixture of 41 grams of N-thiodiglycolyl-4,4'-diaminodiphenyl sulphone, prepared according to the method of Example III, 75 cc. of acetone and 11 grams of acetic anhydride was refluxed for two hours. 100 cc. of water was added and the acetone was evaporated. The solid material was filtered off, washed with water and dried at 80° C. The product was N-thiodiglycolyl-N'-acetyl-4,4'-diaminodiphenyl sulphone.

As an alternative procedure, a molecular equivalent of N-acetyl-4,4'-diaminodiphenyl sulphone, prepared according to the method described in J. Am. Chem. Soc., 61, 2763 (1939), or the method described in United States Patent No. 2,260,626, issued October 28, 1941, to Kleiderer and Van Arendonk, may be reacted with a molecular equivalent of thiodiglycolic anhydride, using the method of the present example, to produce the product, N-acetyl-N'-thiodiglycolyl-4,4'-diaminodiphenyl sulphone, which is identical with the product described hereinbefore in the present example.

Other mixed N-acyl-4,4'-diaminodiphenyl sulphone compounds embodying the acyl residues derived from the anhydrides described herein may also be prepared by the methods described in the aforescribed examples. Among these acyl derivatives are the following:

N-diglycolyl-N'-dithiodiglycolyl
N-diglycolyl-N'-thionyldiglycolyl
N-diglycolyl-N'-sulphondiacetyl
N-thiodiglycolyl-N'-dithiodiglycolyl
N-dithiodiglycolyl-N'-sulphondiacetyl
N-thionyldiglycolyl-N'-sulphondiacetyl
N-thionyldiglycolyl-N'-dithiodiglycolyl In place of the anhydrides described hereinbefore, the acyl halides or the mono-ester acyl halides of the acids may be employed. In this event, after condensation of the acyl dihalide or the mono-ester acyl halide with an amino group, the hydrolysis of the residual halide or monoester residue is made necessary in order to expose the free carboxyl radical of the acid residue.

As a further alternative, the diaminodiphenyl sulphone or 4-nitro-4'-aminodiphenyl sulphone may be condensed with the acid directly, forming first an amine salt and subsequently dehydrating the amine salt with the aid of heat and, if desired, a dehydration catalyst to accelerate the reaction. The dehydration reaction may be conducted at reduced pressure.

The derivatives of the present invention may be recovered as the hydrates. For example, N,N'-di-thiodiglycolyl-4,4'-diaminodiphenyl sulphone may be recovered as the dihydrate and N,N'-di-diglycolyl-4,4'-diaminodiphenyl sulphone as the trihydrate. This water of hydration may be removed by heating the respective compounds in a stream of heated air or in vacuo below the temperature at which decomposition begins.

I claim:

1. A di-substituted 4,4'-diaminodiphenyl sulphone which is represented by the formula:

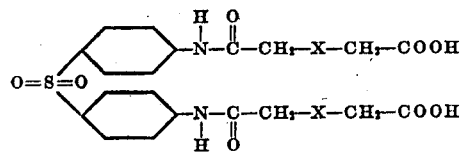

in which

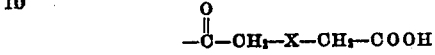

represents a residue selected from the group consisting of diglycolyl, thiodiglycolyl, dithiodiglycolyl, thionyldiglycolyl and sulphondiacetyl residues.

2. N,N'-di-diglycolyl-4,4'-diaminodiphenyl sulphone.

3. N,N'-di-thiodiglycolyl-4,4'-diaminodiphenyl sulphone.

4. The disodium salt of N,N'-di-thiodiglycolyl-4,4'-diaminodiphenyl sulphone.

5. The product set forth in claim 1, in which at least one carboxyl hydrogen is replaced by a metal ion selected from the group consisting of alkali-metal, alkaline-earth metal, ammonium and substituted ammonium ions.

LUCAS P. KYRIDES.